United States Patent [19]

Hicks

[11] Patent Number: 4,865,341
[45] Date of Patent: Sep. 12, 1989

[54] APPARATUS FOR VARYING A VEHICLE WHEELBASE

[76] Inventor: W. Glen Hicks, 809 Kennon St., Minden, La. 71055

[21] Appl. No.: 33,507

[22] Filed: Apr. 1, 1987

Related U.S. Application Data

[63] Continuation-in-part of Ser. No. 743,141, Jun. 10, 1985, Pat. No. 4,660,843.

[51] Int. Cl.⁴ ............................................. B60P 1/18
[52] U.S. Cl. ............................ 280/149.2; 298/14; 298/22 AE; 414/475
[58] Field of Search .................... 280/80 B, 656; 298/1 SG, 12, 14, 20 R, 20 A, 22 R, 22 AE; 105/222; 414/475

[56] References Cited

U.S. PATENT DOCUMENTS

| | | | |
|---|---|---|---|
| Re. 25,315 | 1/1963 | Harbers et al. | 298/204 X |
| 2,682,419 | 6/1954 | Wolf | 280/405 |
| 2,853,341 | 9/1958 | Morse | 298/20 A |
| 2,861,837 | 11/1958 | Morse | 298/20 A |
| 3,055,710 | 9/1962 | Black | 298/22 AE X |
| 3,152,837 | 10/1964 | Margala | 280/80 B |
| 3,181,914 | 5/1965 | Humes | 280/8 B X |
| 3,512,836 | 5/1970 | Polich | 298/22 AE X |
| 3,606,059 | 9/1971 | Haberle | 280/80 B X |
| 4,033,625 | 7/1977 | Fikse | 280/80 B X |
| 4,125,198 | 11/1978 | Landoll | 280/80 B |
| 4,353,565 | 10/1982 | Smith et al. | 280/80 B |

FOREIGN PATENT DOCUMENTS 2137940 10/1984 United Kingdom .............. 280/80 B

OTHER PUBLICATIONS

McNeilus Truck & Mfg. Co. brochure.

Primary Examiner—Frank E. Werner
Assistant Examiner—Janice Krizek
Attorney, Agent, or Firm—Richards, Harris, Medlock & Andrews

[57] ABSTRACT

A trailer body (600) and pedestal (604) are provided where the pedestal supports an axle assembly (605) which is pivotally secured to the pedestal so that when the pedestal is in the forward position to permit trailer dumping, the axle assembly pivots about the pedestal to keep all wheels (612) on the ground. A safety plate (630) can be mounted between a frame and pedestal to prevent structure from being wedged between the transverse beams of the frame and pedestal as the pedestal slides relative to the frame. Also, a striker plate (616) is employed to prevent a locking wedge (622) from interfering with movement of the pedestal relative to the frame until the pedestal is either in the rearward position or in the forward position. A fender structure (614) is provided which acts as a fender when the pedestal is in the rearward position, but is not damaged as the pedestal moves to the forward position.

1 Claim, 10 Drawing Sheets

APPARATUS FOR VARYING A VEHICLE WHEELBASE

CROSS REFERENCE TO RELATED APPLICATIONS

This application is a continuation-in-part of U.S. application Ser. No. 743,141, filed June 10, 1985, now U.S. Pat. No. 4,660,843.

TECHNICAL FIELD

This invention relates to payload bearing vehicles, and in particular to a variable wheelbase vehicle permitting transport of increased payload.

BACKGROUND OF THE INVENTION

Many jurisdictions within the United States and foreign countries have established regulations for the gross weight of a highway vehicle, such as a semi-trailer. The gross weights permitted are typically related to the vehicle size, and particularly to the vehicle wheelbase.

In particular, the gross weight permitted is often related to the number of axles on the vehicle and the wheelbase defined as the distance between selected axles. In the common semi-trailer type configuration including a power unit and a trailer, the wheelbase can be measured a number of ways. The wheelbase can be measured between the leading and trailing axles of the trailer, between the leading drive axle of the power unit and the trailing axle of the trailer or between the steering axle of the power unit and the trailing axle of the trailer.

A careful consideration of the axles used to determine the allowable gross vehicle weight is necessary to pick the optimal wheelbase measurement to permit the maximum payload to be carried in the vehicle. In optimizing this measurement, the total weight and weight distribution of the power unit and trailer must be considered.

Because the power unit and trailer of the vehicle are commonly designed and constructed to carry a much greater payload than that permitted by law, it is desired to design a vehicle for the maximum legal wheelbase, permitting a large payload to be carried, while minimizing the problems associated with lengthening the length of the vehicle, such as stability and turning radius.

One commonly used vehicle is the "end dump"-trailer, which is a dump truck designed for semitrailer operation. The end dump trailer will typically include a trailer body for containing the payload, a rear tandem wheel unit which pivotally supports the rear of the trailer body, and structure for pivoting the trailer body about the rear tandem wheel unit to tilt the trailer body for dumping. The end dump trailer can be a "frameless" type, which has no non-pivoting frame supporting the trailer body, or a "frame" trailer which incorporates a rigid non-pivoting frame to support the pivoting structure. The trailer is designed to permit the trailer body to be tilted to an angle of approximately 50° from the horizontal for dumping operations. The rear tandem wheel unit supports the rear of the trailer. The drive axles of the power unit will support the front of the trailer. In operation, a body length of about 32 feet has been found to be a desirable maximum figure. Trailer body lengths of 35 and 37 feet are believed in the industry to be nonstable in the dumping position. Therefore, a need exists to design an end dump trailer which includes a trailer body length that is acceptable in the industry while maximizing the permitted gross vehicle weight and payload under the law.

In addition to the "end dump" trailer, a similar need exists with regard to the "roll off" trailer. This trailer operates in a manner very similar to the frameless trailer noted previously. However with the roll off trailer, a trailer body or container is slidable on or off the trailer in the tilted position.

SUMMARY OF THE INVENTION

In accordance with one aspect of the present invention, a vehicle is provided for use with a support device. The vehicle includes an integral trailer body and frame having a dumping end and a forward end. A pedestal is provided for supporting multiple axles. Structure supports the pedestal on the integral trailer body and frame proximate the dumping end for slidable motion of the pedestal along the frame between a forward position and a rearward position. Structure is provided for supporting the frame on the support device and includes at least one rigid member pivoted at one end to the frame and at the opposite end proximate the support device and an extendable member pivoted at one end to the frame spaced from the dumping end and at the opposite end proximate the support device and variable in length from a contracted state to an extended state. In the contracted state, the frame is horizontal for traveling. In the extended state, the frame is tilted for dumping.

The vehicle also includes pedestal mounted wedge structure and frame mounted wedge structure. The pedestal mounted wedge structure and frame mounted wedge structure move into a wedging position when the pedestal is in the forward and rearward positions to wedge the pedestal to the frame in either the forward or rearward position for vehicle operation. Locking structure is provided for urging the pedestal mounted wedging structure and frame mounted wedging structure into the wedging position when the pedestal is in either the forward or rearward positions. The forward position of the pedestal permits dumping of the trailer payload while the rearward position of the pedestal is employed for trailering. In the forward position, all the wheels of the multiple axles remain on the ground, even when the trailer is elevated to the dumping position, to maintain trailer stability. At least one of the axles is positioned rearward of the frame when the pedestal is in the rearward position.

In accordance with still another aspect of the present invention, the vehicle previously described is provided with a frame for mounting a roll off container thereon. The frame is horizontal to carry the roll off container when the extendable member is in the contracted state and tilted for movement of the container relative to the frame when the extendable member is in the extended state.

When the pedestal is moved relative to the frame or trailer body to which it is attached, the various support elements within the structures slide relative to each other. A safety plate is provided on one of the structures so that it is unlikely that anything could be caught between the relative moving frame members.

In one embodiment, the locking structure for locking the pedestal to the frame or trailer body includes one or more wedges. A striker bar is provided to prevent the wedges from engaging until the pedestal has completed its movement to either the forward or rearward position.

In accordance with another aspect of the present invention, fender structure is mounted on the rear axle which will comply with the relevant road laws when the pedestal is in the rearward position and yet be protected from damage as the pedestal is moved to the forward position and pivoted relative to the axle for dumping.

In accordance with yet another aspect of the present invention, the advantages of the slidable pedestal safety plate can be used for vehicles which are not intended for dumping, such as van trailers.

DESCRIPTION OF THE DRAWINGS

A more complete understanding of the invention and its advantages will be apparent from the following Detailed Description when taken in conjunction with the accompanying Drawings, in which.

DETAILED DESCRIPTION

Figure 1:
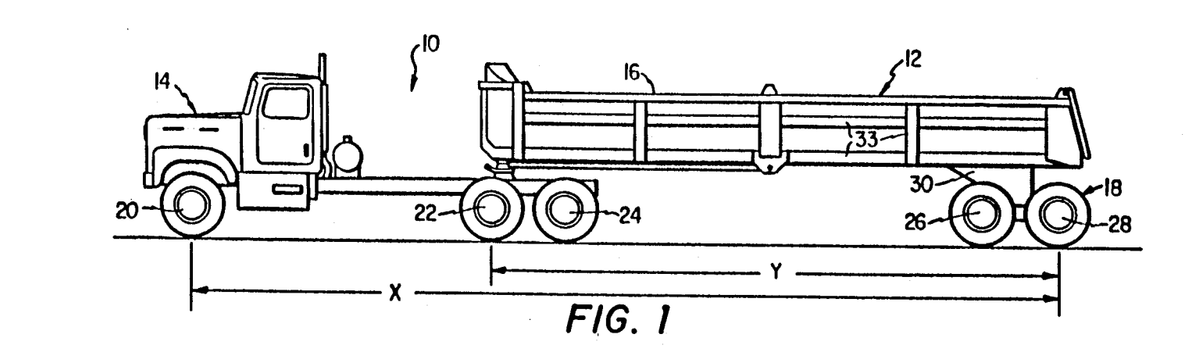
FIG. 1 is a side view of a power unit and frameless end dump trailer illustrating the rear tandem wheel unit in the forward position for dumping operation.
Figure 2:
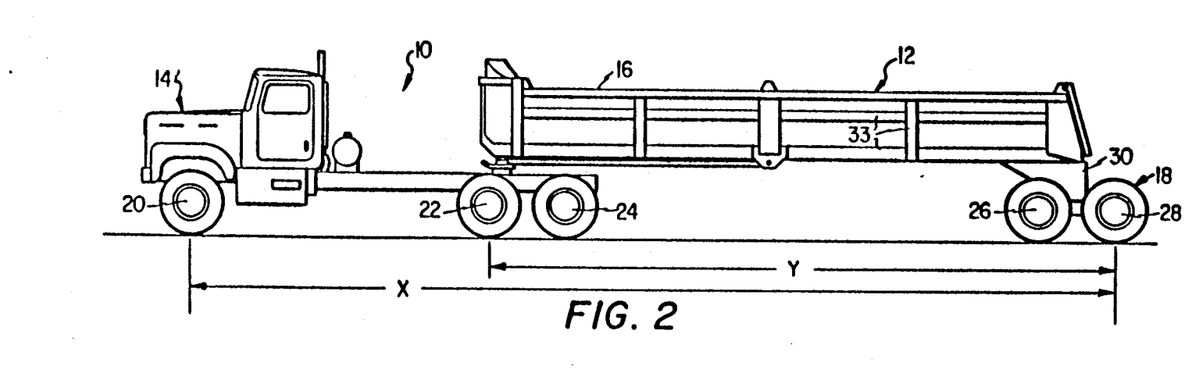
FIG. 2 is a side view of the power unit and end dump trailer with the rear tandem wheel unit in the rearward position for highway travel.
Figures 3, 4:
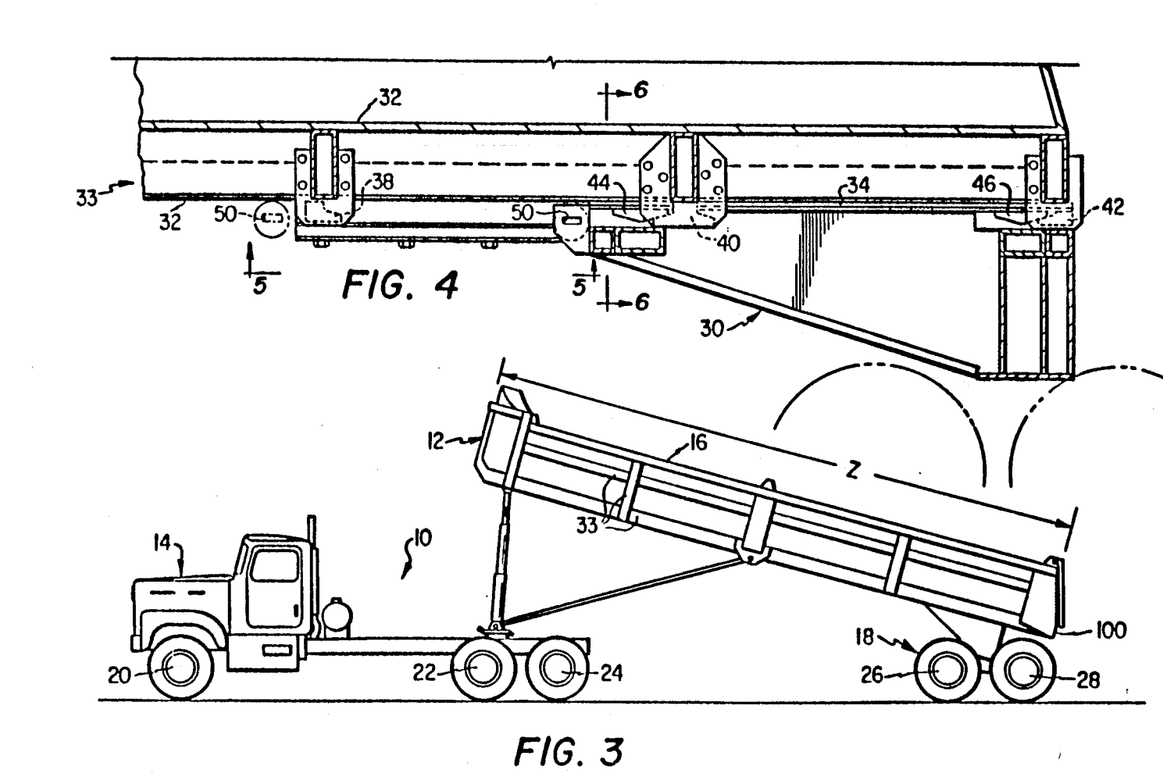
FIG. 3 is a side view of the power unit and end dump trailer with the trailer body in the tilted position for dumping the payload.
FIG. 4 is a side view of a portion of the trailer illustrating the wedge structure.

Referring now to the Drawings, wherein like reference characters designate like or corresponding parts throughout several views, and in particular to FIGS. 1-3, a vehicle 10 is illustrated which includes an end dump trailer 12 and a power unit 14. The end dump trailer 12 is in the horizontal position shown in FIGS. 1 and 2 during loading of the payload and while traveling on the highway. When the payload is to be dumped, a hydraulic mechanism in the end dump trailer 12 will pivot the trailer body 16 about a pivotal connection to the rear tandem wheel unit 18 to an angle up to approximately 50° from the horizontal.

As set forth in the background of the invention, local jurisdictions have restrictions on gross vehicle weight based on certain lengths between axles on a vehicle. The vehicle 10 illustrated has a steering axle 20 and forward and rearward drive axles 22 and 24 on the power unit 14. Trailer 12 has a forward trailing axle 26 and a rearward trailing axle 28.

As noted previously, common wheelbase measurements for determining the gross weight permitted are between the steering axle of the power unit and the last trailing axle of the trailer, distance X in FIGS. 1 and 2, and between the forward drive axle of the power unit and the last trailing axle of the trailer, distance Y in FIGS. 1 and 2. The following table is an example of one jurisdiction's regulations regarding wheelbase and gross vehicle weight. In this table, the number of axles is the total number of axles between the axles at which the wheelbase is measured, including the measurement axles. For example, the distance X in FIGS. 1 and 2 includes 5 axles. The distance Y includes 4 axles.

TABLE 1

| Wheelbase Distance in Feet | Allowable Gross Vehicle Weight (lb) 4 Axles | Allowable Gross Vehicle Weight (lb) 5 Axles |
| --- | --- | --- |
| 26 | 60,600 | 64,000 |
| 27 | 61,500 | 65,000 |
| 28 | 62,500 | 65,500 |
| 29 | 63,450 | 66,000 |
| 30 | 64,400 | 66,500 |
| 31 | 65,350 | 67,500 |
| 32 | 66,300 | 68,000 |
| 33 | 67,250 | 68,500 |
| 34 | 68,200 | 69,000 |
| 35 | 69,150 | 70,000 |
| 36 | 70,100 | 70,500 |
| 37 | 71,050 | 71,000 |
| 38 | 72,000 | 71,500 |
| 39 | 72,000 | 72,500 |
| 40 | 72,000 | 73,000 |
| 41 | 72,000 | 73,500 |

TABLE 1-continued

| Wheelbase Distance in Feet | Allowable Gross Vehicle Weight (lb) 4 Axles | Allowable Gross Vehicle Weight (lb) 5 Axles |
|---|---|---|
| 42 | 72,000 | 74,000 |
| 43 | 72,000 | 75,000 |
| 44 | 72,000 | 75,500 |
| 45 | 72,000 | 76,000 |
| 46 | 72,500 | 76,500 |
| 47 | 73,500 | 77,500 |
| 48 | 74,000 | 78,000 |
| 49 | 74,500 | 78,500 |
| 50 | 75,500 | 79,000 |
| 51 | 76,000 | 80,000 |

As can be seen, this gross weight table is independent of the actual length Z of the trailer body 16 of the vehicle 10 as shown in FIG. 3. The gross weight table therefore provides an artificial limit to the payload carrying capacity of the vehicle 10.

As also noted in the Background of the Invention, it has been found that many vehicle users prefer a trailer body length Z not exceeding 32 feet. In the normal construction of a 32 foot trailer body 16, the rear tandem wheel unit 18 must be positioned relative to the body as illustrated in FIGS. 1 and 3 to permit the trailer body 16 to pivot upward for dumping of the payload. If the rear tandem wheel unit 18 was permanently mounted behind the dumping lip 100 of the trailer body 16 seen in FIG. 3, a protective shield or ramp would be required to protect the unit 18 from damage from the payload during dumping. Also, the maximum dumping angle of the trailer body 16 generally decreases as wheel unit 18 is positioned further back on the trailer 12.

In one vehicle 10 having a trailer body length Z of 32 feet, the distance X is 46 foot 10 inches and the distance Y is 30 foot 6 inches. As can be readily found on the gross weight Table 1, a length X of 46 foot 10 inches would permit a gross vehicle weight of 77,500 pounds. The distance X of 30 foot 6 inches would permit a gross vehicle weight of 65,350 pounds. It will be recalled that the gross vehicle weight includes the actual weight of the trailer and power unit that is supported by the axles within the measured wheelbase. Therefore, in evaluating the gross vehicle weight from Table 1 using the distance Y, the weight of the vehicle 10 on the steering axle 20 would not form part of the gross vehicle weight.

Table 2 illustrates the weight in pounds on the steering axle, drive axles and trailing axles for one vehicle having a 32 foot long trailer body 16.

TABLE 2

| | Total Weight | Weight on Steering Axle | Weight on Drive Axles | Weight on Trailing Axles |
|---|---|---|---|---|
| Power Unit | 16,865 | 8,777 | 8,088 | 0 |
| Trailer | 10,337 | 160 | 2,552 | 7,625 |
| Payload | 48,552 | 1,467 | 23,360 | 23,725 |
| Combination | 75,754 | 10,404 | 34,000 | 31,350 |

As can be seen, the distance Y would be used to measure the wheelbase to achieve the maximum payload for vehicle 10. The gross vehicle weight measured between axles 22 and 28 would exactly equal that permitted by Table 1. If the wheelbase X, between axles 20 and 28, were used to measure the wheelbase, the permitted gross vehicle weight would be exceeded.

In accordance with the teachings of the present invention, the pedestal 30 supporting the rear tandem wheel unit 18 on the trailer 12 is slidable along the length of the trailer between the forward position shown in FIGS. 1 and 3 and the rearward position shown in FIG. 2. By sliding the pedestal 30 into the rearward position, the wheelbase X on the vehicle having a 32 foot long trailer body 16 is increased to 49 foot 10 inches and the wheelbase Y is increased to 33 foot 6 inches. The allowable gross vehicle weight is calculated as follows in Table 3.

TABLE 3

| | Total Weight | Weight on Steering Axle | Weight on Drive Axles | Weight on Trailing Axles |
|---|---|---|---|---|
| Power Unit | 16,865 | 8,777 | 8,088 | 0 |
| Trailer | 10,537 | 182 | 2,855 | 7,500 |
| Payload | 51,029 | 1,472 | 23,057 | 26,500 |
| Combination | 78,431 | 10,431 | 34,000 | 34,000 |

Again, selecting the wheelbase Y between axles 22 and 28 provides the maximum payload within the guidelines set by Table 1. It will be observed that the legal payload has been increased by 2,477 pounds compared to the analysis of Table 2. This increase is permitted simply by moving the rear tandem wheel unit 18 and pedestal 30 from the forward position to the rearward position for traveling over a public highway where the jurisdiction has a weight table such as Table 1.

The operation of trailer 12 is better described with reference to FIGS. 4–6. With reference to FIGS. 4 and 6, the pedestal 30 slidably contacts the bottom of channels 32 forming part of the frame 33 of the trailer body 16 and located on other side of the trailer body. Polyethylene pads 34 are bolted to the surface 36 of the pedestal 30 by bolts 37 proximate the channels 32 to reduce friction between the trailer body 16 and pedestal 30 and also to provide a cushioning action between the two elements.

Forward frame wedges 38, middle frame wedges 40 and rearward frame wedges 42 are positioned on either side of the trailer body 16 on the channels 32. The frame wedges 38, 40 and 42 cooperate with forward pedestal wedges 44 and rearward pedestal wedges 46. In the forward position of pedestal 30 shown in FIGS. 1 and 3, the forward pedestal wedges 44 engage the forward frame wedges 38 and the rearward pedestal wedges 46 engage a portion of the middle frame wedges 40. In the rearward position illustrated in FIGS. 2 and 4, the forward pedestal wedges 44 are engaged with a portion of the middle frame wedges 40 and the rearward pedestal wedges 46 are engaged with the rearward frame wedges 42 to wedge the pedestal to the frame 33 in the rearward position.

Figure 5:
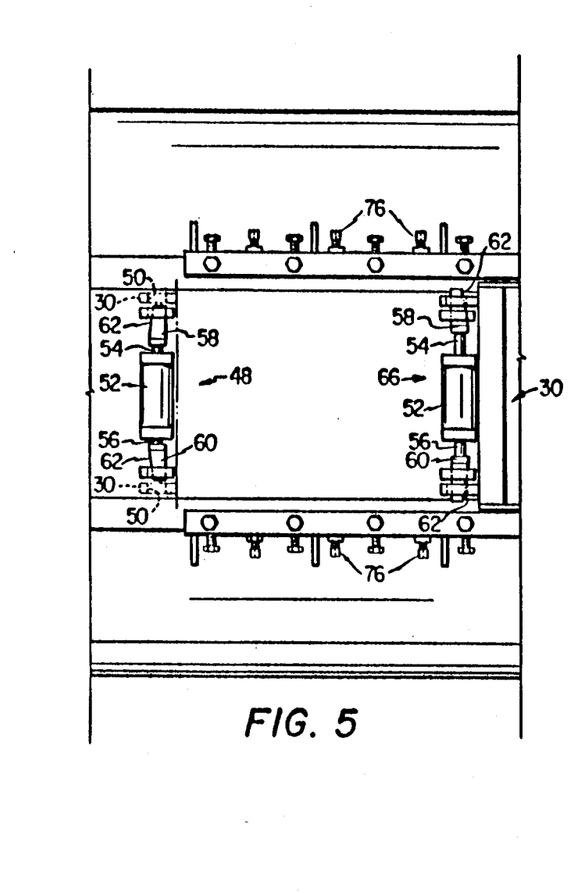
FIG. 5 is a top view of a portion of the trailer along line 5—5 in FIG. 4 to illustrate the locking structure.
Figure 6:
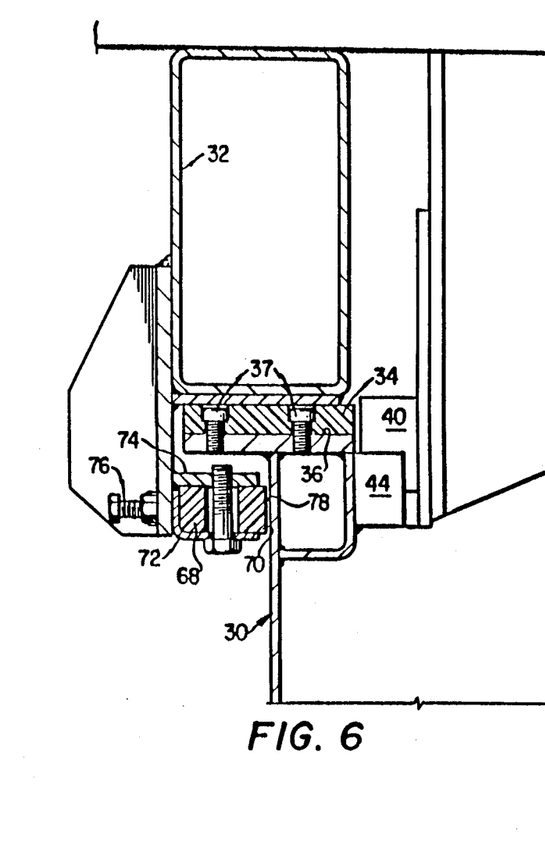
FIG. 6 is a vertical cross section of the trailer taken along line 6—6 in FIG. 4.

A forward locking assembly 48, shown in FIG. 5, is mounted on the frame 33 and cooperates with locking holes 50 formed in the pedestal 30 as shown in FIG. 4. The forward locking assembly 48 comprises a dual double acting cylinder 52 having pistons 54 and 56 shown in their retracted positions in FIG. 5. Locking wedges 58 and 60 are positioned at the end of pistons 54 and 56, respectively. When the pedestal is moved into the forward position by locking the brakes on the rear tandem wheel unit 18 and backing the power unit 14, the pistons 54 and 56 can be activated to drive the locking wedges 58 and 60 into the locking holes 50. The wedges 58 and 60 have wedge surfaces 62 which act to wedge the pedestal wedges into the frame wedges when the pistons 54 and 56 move outwardly from the dual cylinder 52. In the forward position, the vehicle 10 is adapted for payload dumping. In fact, since the positioning of a rear tandem wheel unit in prior vehicle designs was a compromise between wheel base and dumping requirements, the forward position of wheel unit 18 could be forward of the wheel unit placement on the prior vehicle, thereby possibly increasing the maximum dumping angle of the trailer body 16 over the maximum dumping angle in the prior vehicles.

A rearward locking assembly 66 is also mounted on the frame 33. The rearward locking assembly 66 comprises the identical elements of forward locking assembly 48 but with the wedge surfaces 62 oriented in the direction opposite those in the forward locking assembly 48. To move the pedestal 30 into the rearward position, the brakes on unit 18 are again locked and the power unit 14 is moved forward. The rearward locking assembly 66 will act to wedge the pedestal wedges into the frame wedges when the pedestal 30 is in the rearward position for travel on a public highway.

The pedestal 30 is aligned with the frame 33 by polyethylene blocks 68 having guide surfaces 70 as best shown in FIG. 6. The blocks 68 are secured to angle members 72 which are bolted to a flange 74 on each side of the frame 33 as best seen in FIG. 6. The angle member 72 and blocks 78 can be adjusted inwardly toward the pedestal or outwardly from the pedestal by adjusting screws 76. Typically, a small gap 78 will be maintained between the guide surfaces 70 and the pedestal 30. The polyethylene blocks 68 will maintain the pedestal 30 aligned with the frame 33 both in the forward and rearward positions and while moving between the positions.

In the preferred construction, the dual cylinders 52 in both the forward and rearward locking assemblies 48 and 66 are double acting and operated by air pressure. This will permit the locking assemblies to be operated by the vehicle operator from within the cab of the power unit 14.

While the vehicle 10 illustrated and described above is an end dump trailer, it will be apparent that the teachings of the present invention can be applied to other vehicles subject to similar gross vehicle weight limitations where the slidable nature of the pedestal 30 can increase the legal wheelbase of the vehicle to increase the usable payload. It is also apparent that the design of the trailer 12 with the sliding pedestal 30 can be adapted for any purpose where the design would prove useful.

Figure 7:
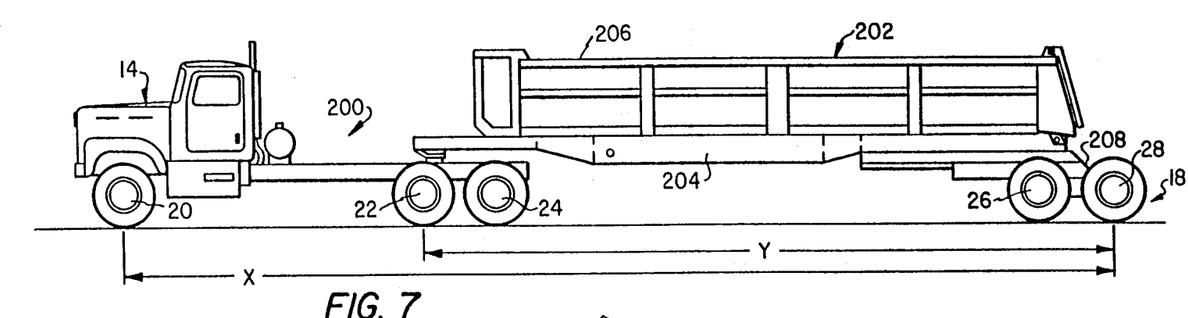
FIG. 7 is a side view of the power unit and frame end dump trailer with the rear tandem wheel unit in the rearward position for highway travel.
Figure 8:
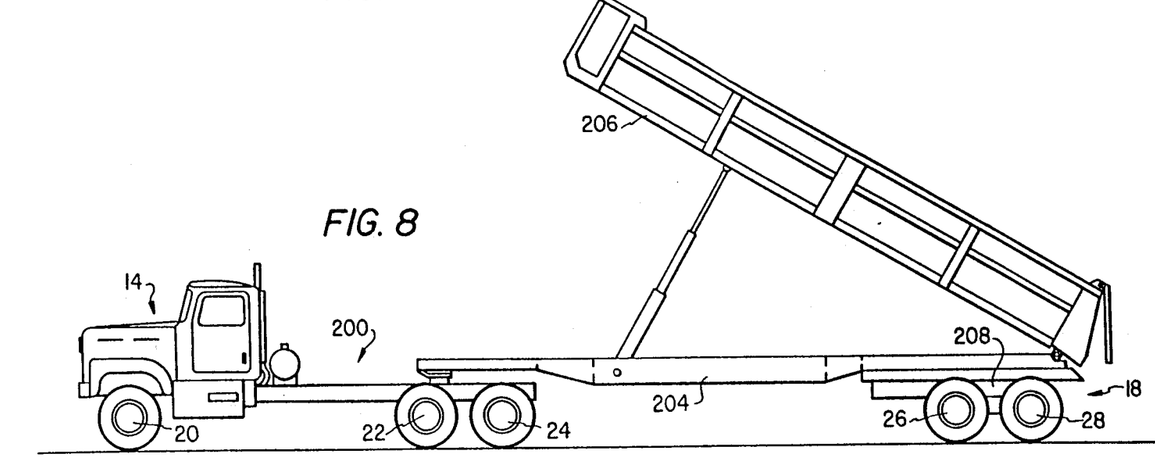
FIG. 8 is a side view of a power unit and a frame end dump trailer illustrating the rear tandem wheel unit in the forward position for dumping operation.

The vehicle 10 described above and illustrated in FIGS. 1–6 is commonly referred to as a frameless end dump trailer as the main frame and trailer body of end up trailer 12 are integral. FIGS. 7–11 illustrate a vehicle 200 which incorporates a frame type end dump trailer 202. Frame end dump trailer 202 includes a separate horizontal rigid frame 204 which is attached at its forward end to the power unit 14 and a trailer body 206 which is pivoted near the dumping end of the rigid frame 204 for pivotal motion between a horizontal traveling position as shown in FIG. 7 and a tilted dumping position as shown in FIG. 8.

Like vehicle 10, vehicle 200 also includes a steering axle 20, forward drive axle 22, rearward drive axle 24, forward trailing axle 26 and a rearward trailing axle 28. Again, the legal gross weight permitted for vehicle 200 is based on the common wheel base measurements between the steering axle of the power unit and the last trailing axle of the trailer, distance x in FIGS. 7 and 8, and between the forward drive axle of the power unit and the last trailing axle of the trailer, distance y in FIGS. 7 and 8. The trailing axles 26 and 28 are supported on a pedestal 208 and collectively form a rear tandem unit wheel unit 18. The pedestal 208 performs the identical function of pedestal 30 discussed previously in permitting dumping of the trailer body 206 when in the forward position shown at FIG. 8 and for trailering when in the rearward position shown in FIG. 7. By sliding the pedestal 208 into the rearward position, the wheel base is increased to increase the legal gross vehicle weight permitted.

Figure 9:
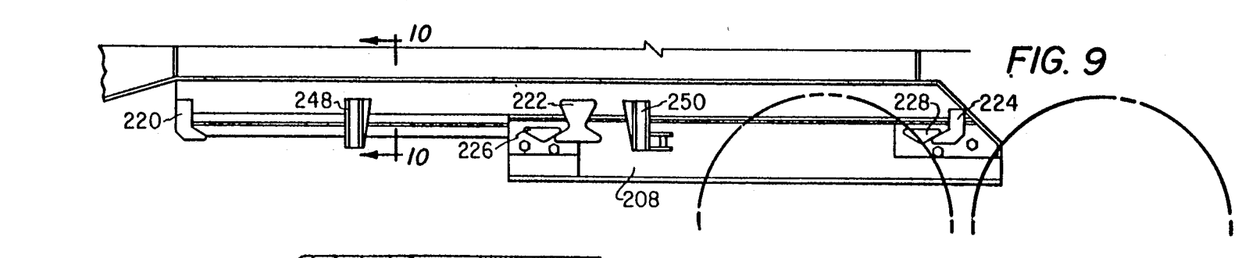
FIG. 9 is a side view of a portion of the frame end dump trailer.
Figure 10:
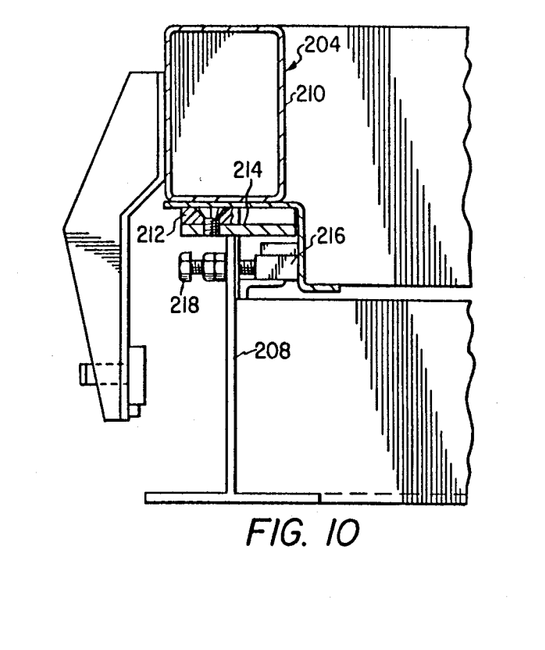
FIG. 10 is a cross-sectional view of the frame end dump trailer taken along line 10—10 in FIG. 9.

As best seen in FIG. 10, the pedestal 208 slidably contacts the bottom of channels 210 forming part of the frame 204. Polyethylene pads 212 are bolted to the upper surface 214 of the pedestal 208 to reduce friction between the trailer frame 204 and pedestal 208 and also to provide a cushioning action between the two elements. An adjustable side bearing 216 is mounted on the pedestal by a threaded bolt 218. The threaded bolt 218 can be rotated to move the side bearing 216 into contact with the side of the frame 204 to insure the pedestal will slide along the length of the frame without jamming As best seen in FIG. 9, the vehicle 200 includes forward frame wedges 220, middle frame wedges 222 and rearward frame wedges 224 positioned on either side of the frame 204 on the channels 210. The pedestal 208 is provided with forward pedestal wedges 226 and rearward pedestal wedges 228 on either side of pedestal 208. When the pedestal 208 is in the forward position, the forward pedestal wedges 226 engage the forward frame wedges 220 and the rearward pedestal wedges 228 engage a portion of the middle frame wedges 222. In the rearward position, illustrated in FIG. 9, the forward pedestal wedges 226 engage a portion of the middle frame wedges 222 and the rearward pedestal wedges 228 are engaged with the rearward frame wedges 224

Figure 11:
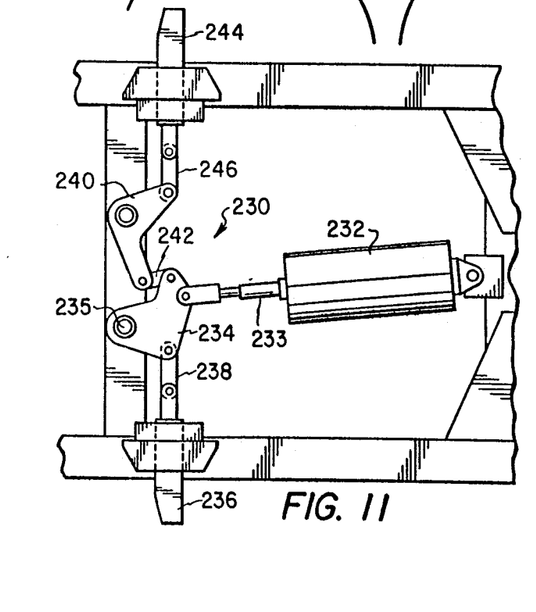
FIG. 11 is a plan view of the locking mechanism of the frame end dump trailer.
Figure 12:
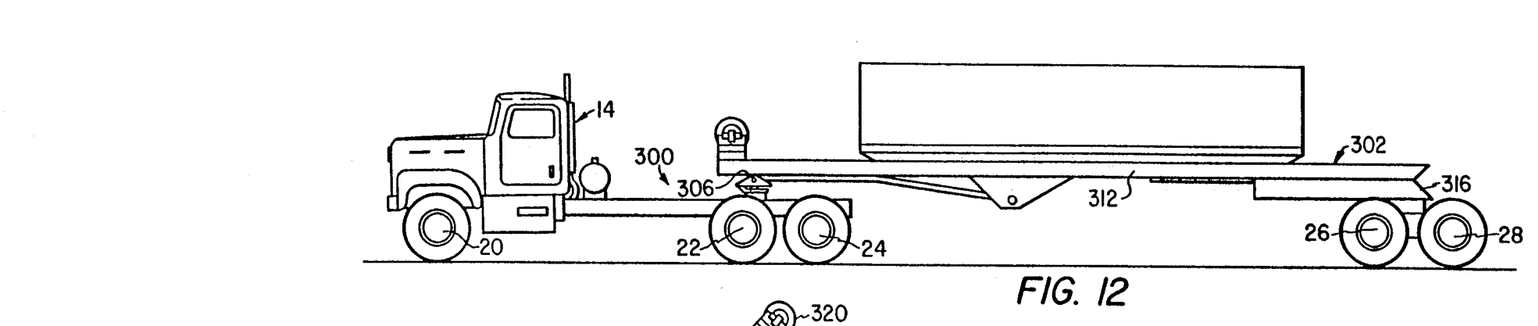
FIG. 12 is a side view of a roll off trailer with the rear tandem wheel unit in the rearward position for highway travel.
Figure 13:
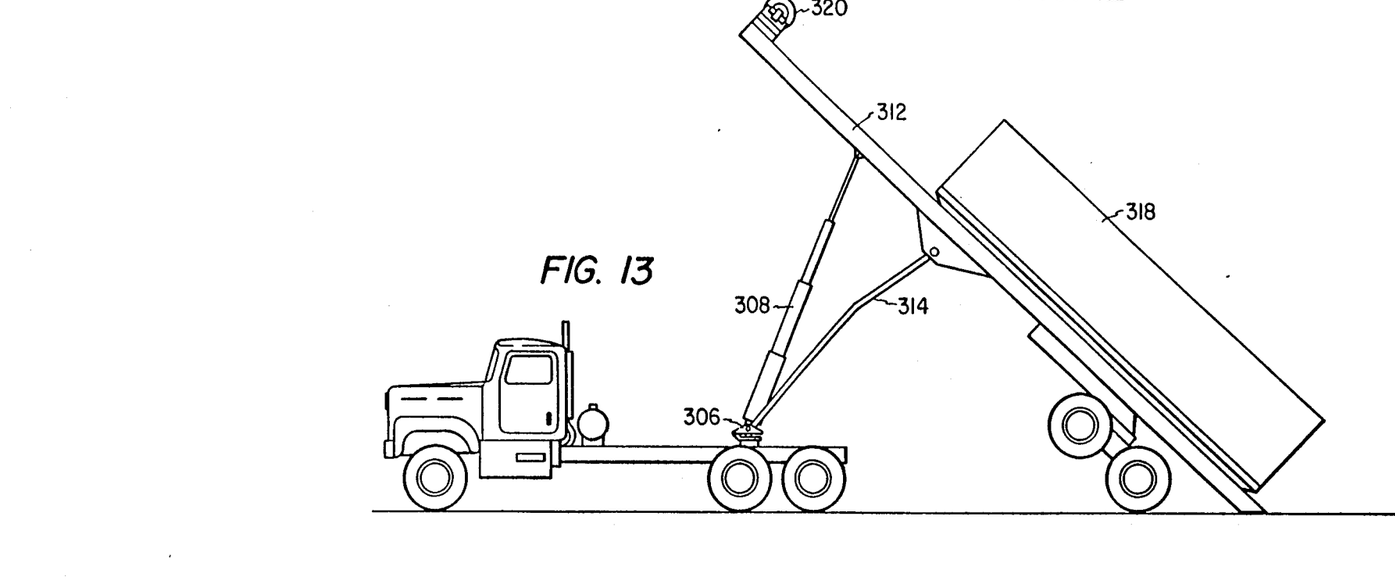
FIG. 13 is a side view of the roll off trailer illustrating the rear tandem wheel unit in the forward position for dumping operation.

With reference to FIG. 11, the locking assembly 230 is illustrated. The locking assembly 230 is mounted on the pedestal 208 and includes an air cylinder 232 having a piston 233. A pivot plate 234 is pivotally mounted to the pedestal at pivot 235 and to the end of the piston 233. Locking wedge 236 is connected to plate 234 by a pivotal link 238. A second pivot plate 240 is pivoted to the pedestal and connected to the plate 234 by a pivotal link 242. The opposite locking wedge 244 is connected to plate 240 by a pivotal link 246. As can be seen, when air is provided to cylinder 232 to extend the piston 233, the wedges 236 and 246 are retracted. When air is provided to the cylinder to retract piston 233 the wedges extend outwardly for locking the pedestal either in the forward position against forward lock plate assemblies 248 or in the rearward position with rear lock plate assemblies 250. In operation, the vehicle 200 is operated in an identical manner to the vehicle 10 described herein above.

With references to FIGS. 12–16, a vehicle 300 is illustrated which includes a roll off trailer 302 and a power unit 14. As with vehicles 10 and 200, the vehicle 300 includes a steering axle 20, forward drive axle 22, rearward drive axle 24, forward trailing axle 26 and rearward trailing axle 28. The vehicle 300 includes a base 306 for attachment to the power unit 14. Base 306 supports twin lifting cylinders 308 which are pivotally mounted to the base 306 at one end and to a tilting frame 312 at the opposite end. A pair of rigid draft arms 314 are also pivoted to the base 306 at one end and to the tilting frame 312 at the other end, albeit spaced from the pivotal attachment of the lifting cylinders 308. The lifting cylinders 308 can lift the tilting frame 312 to the position shown in FIG. 13, where a roll off container 318 can be either moved onto the tilting frame 312 or transferred to another location or removed from the tilting frame 312. Typically, a winch 320 is provided near the forward end of the tilting frame 312 to move the container 318.

A pedestal 316 is slidably mounted near the dumping end of the tilting frame 312. The pedestal 316 is movable between a forward position for dumping and a rearward position for trailering in a manner substantially identical to the pedestals noted previously. The vehicle 300 therefore realizes the same advantages of a variable wheel base as described previously for vehicles 10 and 200.

Figure 14:
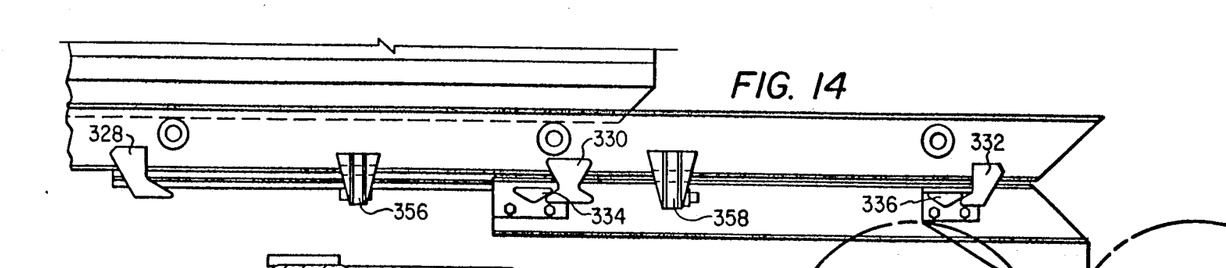
FIG. 14 is a side view of a portion of the roll off trailer illustrating the slider.
Figure 15:
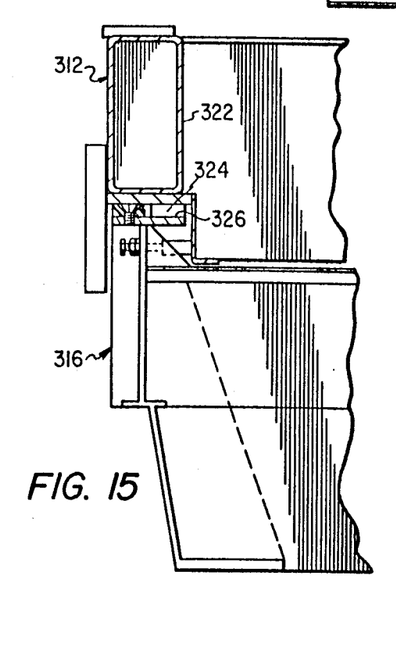
FIG. 15 is a partial end view of the roll off trailer.

As best seen in FIG. 15, the pedestal 316 is supported on channels 322 on the tilting frame 312 through polyethylene pads 324 fastened to upper surface 326 of the pedestal 316. As best seen in FIG. 14, the vehicle 300 includes forward frame wedges 328, middle frame wedges 330 and rear frame wedges 332 which cooperate with forward pedestal wedges 334 and rearward pedestal wedges 336 to wedge the pedestal into either the forward or rearward position as desired.

Figure 16:
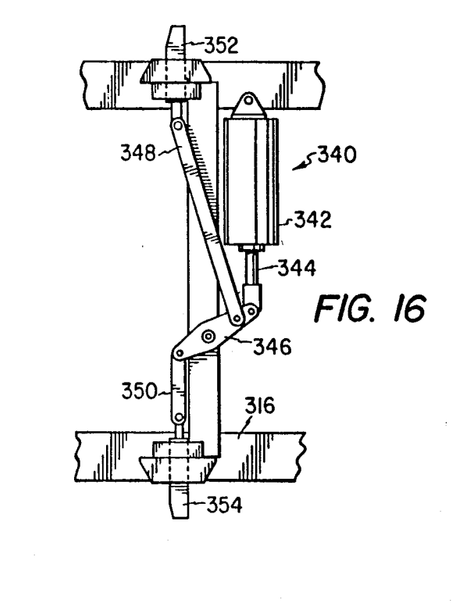
FIG. 16 is a plan view of the locking mechanism of the roll off trailer.

As best seen in FIG. 16, a locking assembly 340 is employed to lock the pedestal at least in the rearward position for traveling. The locking assembly includes an air cylinder 342 which has a movable piston 344. The air cylinder 342 is pivotally mounted on one side of the pedestal 316 and extends transverse the length of the pedestal. The end of the piston 34 is connected to a link 346 which is pivotally mounted on the pedestal. Links 348 and 350 are pivotally mounted to link 346 and at their opposite ends to the wedges 352 and 354, respectively. As is clear from FIG. 16, extension of the piston 344 will retract the wedges to permit the pedestal to move along the tilting frame 312. Retraction of the piston will cause the wedges to wedge into locking cooperation with either the front lock plate assembly 356 or the rear lock plate assembly 358 to lock the pedestal in either the forward or rearward position.

FIGS. 17-20 illustrate another aspect of the present invention embodied in a front helper lifter assembly 500. While assembly 500 can be employed on any trailer having a tilting element, such as frameless type end dump trailer 12 or frame type end dump trailer 202, the assembly 500 is particularly suitable for use on the roll off trailer 302. Preferably, two assemblies 500 are used on each trailer positioned symmetrically on either side of the centerline of the trailer. The function of assemblies 500 is to assist the lifting cylinders 308 in tilting frame 312 from the horizontal where the lifting cylinders 308 are at the poorest mechanical advantage.

Figure 17:
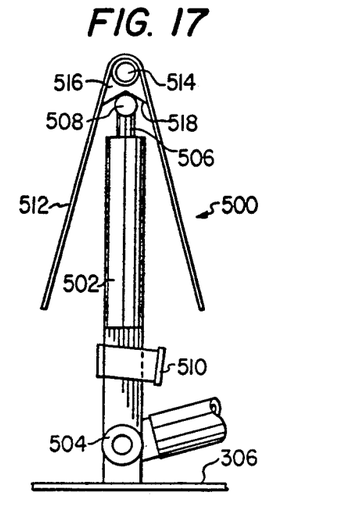
FIG. 17 is an illustrative side view of a front helper lifter mounted on a roll off trailer.
Figure 18:
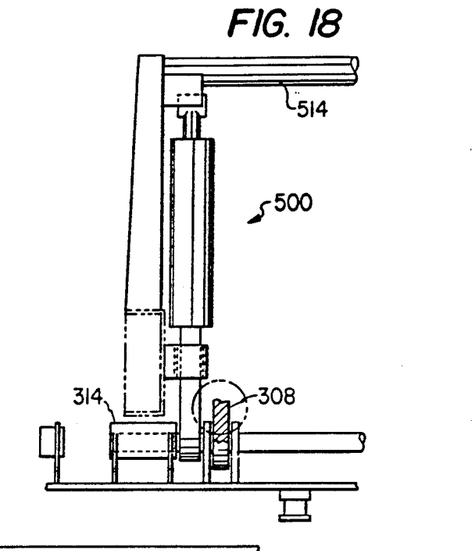
FIG. 18 is an illustrative front view of the front helper lifter and roll off trailer.
Figure 19:
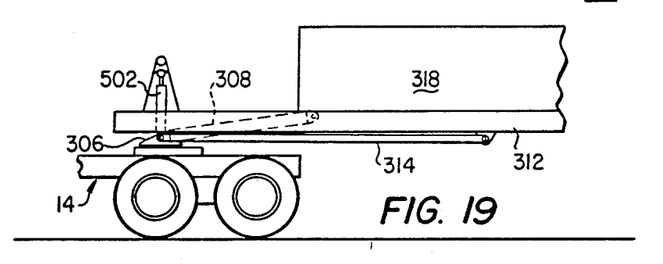
FIG. 19 is an illustrative side view of the roll of trailer in the traveling position.
Figure 20:
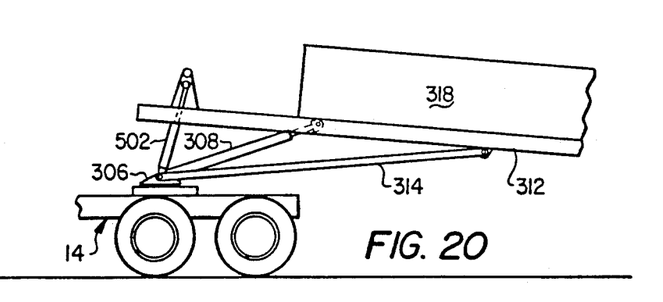
FIG. 20 is an illustrative side view of the roll off trailer being lifted with the assistance of the front helper lifter.

With reference to FIGS. 17 and 18, each of the assemblies 500 can be seen to include a cylinder 502 which is pivotally mounted to a cross shaft 504 on the base 306. As can best be seen in FIG. 18, the lifting cylinders 308 and draft arms 314 are also pivoted on the cross shaft 504. The cylinder 502 has a piston 506 which is extendable from a retracted position as shown in FIGS. 17-19 to an extended position as shown in FIG. 20 by a suitable pressurized fluid, typically compressed air. The piston 506 is provided with a cylindrical end 508. The cylinder 502 is supported in a generally vertical orientation for limited pivotal motion about cross shaft 504 by a stop 510 which is secured to the base 306.

The tilting frame 312 is provided with a pair of triangularly shaped frames 512 which extends upward from each side of frame 312. A bar 514 extends between the frames 512 at their upper end. A bearing block 516 is mounted proximate the top of each of the frames 512 and includes a bearing surface 518 for contacting the cylindrical end 508 of each of the pistons 506. As will be apparent with reference to FIGS. 19 and 20, as compressed air is provided to the cylinders 502 to extend the pistons 506, the cylinders 502 assist in tilting the tilting frame 312 upward until the pistons 506 are fully extended as shown in FIG. 20. As the tilting frame 312 tilts from the horizontal, the cylindrical ends 508 will remain in contact with the bearing surfaces 518 by rolling slightly on the surfaces 518 with the cylinder 502 pivoting on the cross shaft 504. In one embodiment constructed in accordance with the teachings of the present invention, the cylinders with a stroke of 15 inches were employed and at full extension, the cylinders were tilted at an angle of about $7\frac{1}{2}°$ from vertical.

When the pistons 506 have been fully extended as shown in FIG. 20, the lifting cylinders 308 continue to lift the tilting frame 312 to its fully elevated position. The surfaces 518 move away from the ends 508 and the cylinders 502 are supported in a generally vertical orientation by stops 510. As the tilting frame 312 returns to the horizontal position, the cylindrical ends 508 will again come into contact with the bearing surfaces 518. Any misalignment between the cylinders 502 and the frames 512 will be accommodated by the inwardly sloping sides of the frame 512 which naturally guide the cylindrical ends 508 into contact with the bearing surfaces 518. When the tilting frame 312 has been tilted down to the position shown in FIG. 20, the cylinders 502 can then assist the lifting cylinders 308 in lowering the tilting frame 312 to the horizontal.

Figure 21:
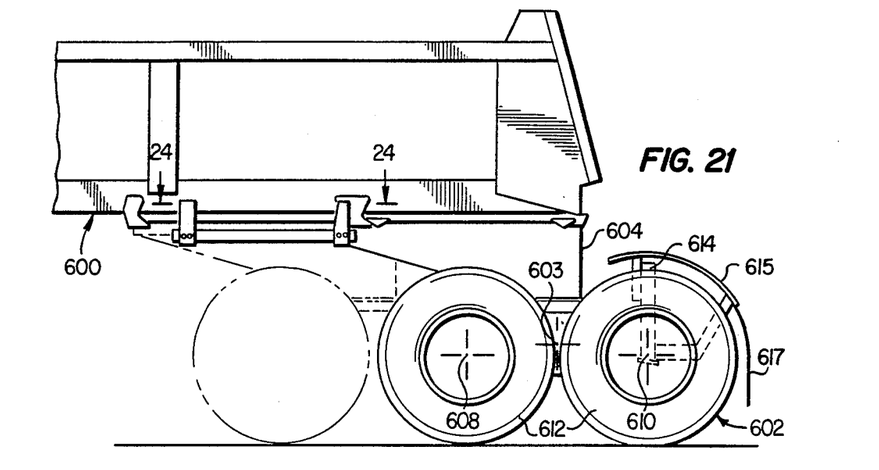
FIG. 21 is a side view of a frameless end dump trailer illustrating the rear tandem wheel unit in the rearward position for trailering illustrating the fender structure.
Figure 22:
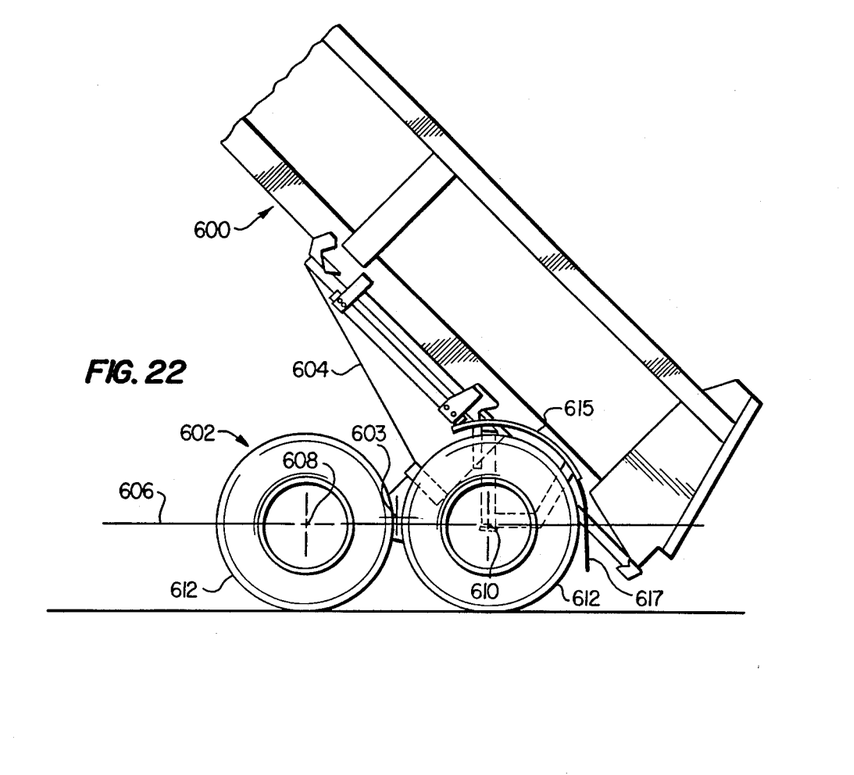
FIG. 22 is a side view of the frameless end dump trailer of FIG. 21 illustrating the rear tandem wheel unit in the forward position for dumping operation and illustrating the advantage of maintaining all wheels of the unit on the ground even when the trailer is fully elevated and without damage to the fender structure.

FIGS. 21 and 22 illustrate a trailer body 600 which incorporates the advantage of maintaining the wheels of all axles on its rear tandem wheel unit 602 on the ground at all times, even when the body is tilted to its maximum dumping angle, perhaps 45 degrees. As can be seen, the wheel unit 602 is pivotally attached to the pedestal 604 along an axis 603 at or near the plane 606 containing the forward trailing axle 608 and the rearward trailing axle 610. Also, the forward position of the unit 602 is sufficiently forward relative to the trailer body to permit the trailer body to pivot to its highest dumping position without the wheels 612 on either axle 608 or axle 610 being forced off the ground as best seen in FIG. 22.

Further, a fender support 614 is mounted on the rearward trailing axle 610 between the road wheels to support fenders 615 and conventional mud flaps 617 and the like to meet the relevant road law requirements for fender structure. The support 614 is designed so that the trailer body 600 can pivot over the support 614 without interference when the unit 602 is in the forward position, as seen in FIG. 22.

Figure 24:
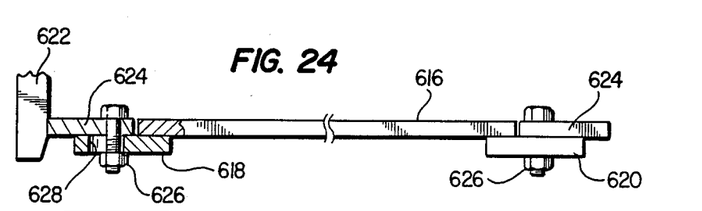
FIG. 24 is a plan view of the striker bar employed to prevent activation of the locking structure until the pedestal is properly wedged in either the forward or rearward position.

With reference now to FIG. 24, as well as FIGS. 21 and 22, a striker plate 616 is illustrated. A striker plate 616 is provided on each side of the trailer body 600 and is secured between the forward lock plate assembly 618 and rear lock plate assembly 620 on the sides of the trailer body. The pedestal 604 is provided with a locking assembly such as locking assembly 230 described previously and shown in FIG. 11. The locking assembly is provided with locking wedges 622 which move outwardly from the pedestal to wedge against the forward end of forward lock plate assembly 618 on each side of the trailer to lock the pedestal in the forward position for dumping and against the rear edge of the rear lock plate assembly 620 to lock the pedestal in the rearward position for trailering. The striker plate 616 extends between the assembly 618 and 620 to prevent the wedges 622 from extending outwardly from the pedestal inadvertently and preventing movement of the pedestal between the rearward and forward positions.

In addition to striker plate 616, FIGS. 21, 22 and 24 illustrate the use of a adjustable lock plate extension 624 which is bolted to the forward lock plate assembly 618 by bolts 626. The slots 628 in assembly 618 are elongated horizontally to permit the extension 624 to be moved horizontally to the proper point of adjustment before tightening the bolts 626 to ensure proper wedging of the pedestal in the forward position. A similar extension 624 is bolted to rear lock plate extension 620.

Figure 23:
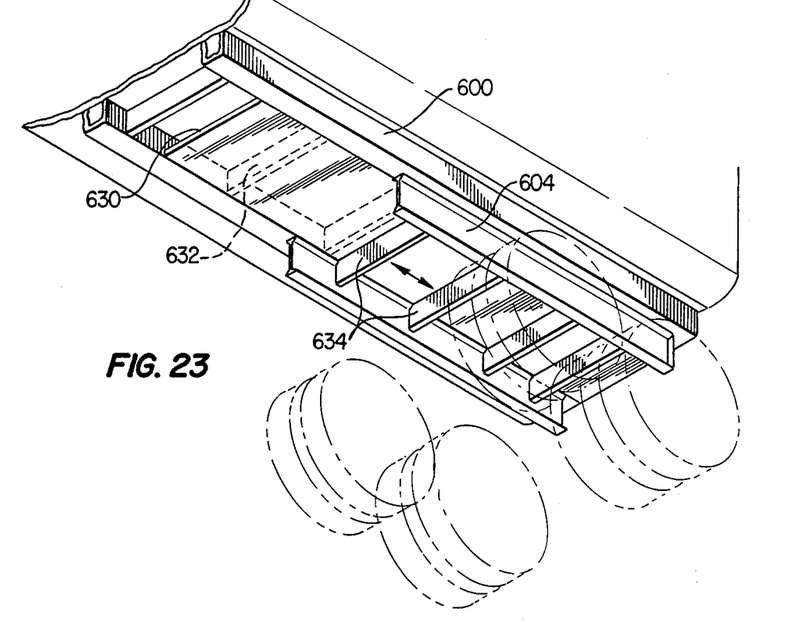
FIG. 23 is a perspective view of a trailer frame and pedestal illustrating the use of a safety plate therebetween.

With reference now to FIG. 23, a safety plate 630 for use between trailer body 600 and pedestal 604 is illustrated. As can be seen, the trailer body 600 incorporates a series of transverse beams 632 while the pedestal 604 is provided with similar transverse beams 634. As the pedestal 604 is slid relative to the trailer body 600, the beams 632 and 634 cross over each other in close proximity. An object, whether human or not, caught between the relatively moving beams could be severely damaged. Therefore, a safety plate 630 is mounted on trailer body 600 to cover the beams 632 to eliminate this problem. Clearly, safety plate 630 could as well be mounted on the pedestal 604 to cover the transverse beams 634.

Figure 25:
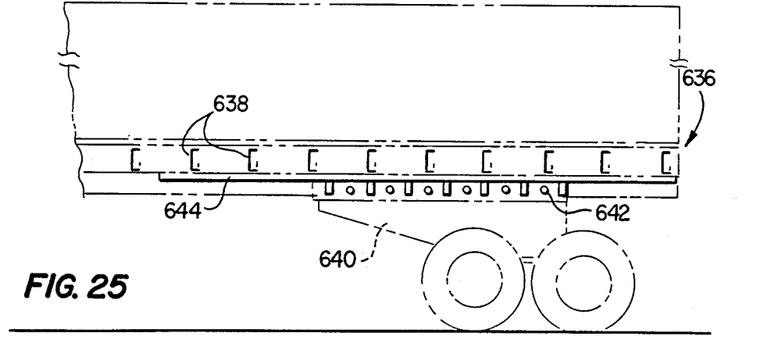
FIG. 25 is a side view of a van trailer having a sliding pedestal incorporating the safety plate.

Also, such a safety plate 630 need not be restricted to use with the particular pedestal 604 used in dumping bodies, but also can be used for vehicles such as van trailer 636 illustrated in FIG. 25. As shown, the floor of the van trailer 636 is formed of a series of transverse L-shaped beams 638 along its entire length. A pedestal 640 is slidable relative to these beams to provide proper weight distribution and can be locked to the van through holes in brackets 642. The safety plate 644 can be positioned on either the van trailer or on the pedestal, as desired, to prevent objects from being positioned between the relatively moving beams.

Although several embodiments of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the scope and spirit of the invention.

I claim:

1. A vehicle for use with a support device, comprising:
    a frame having a forward end and a dumping end, the forward end being supported by the support device;
    a pedestal for supporting at least one axle;
    means for supporting said pedestal on said frame for slidable motion of said pedestal along said frame between a forward position and a rearward position;
    pedestal mounted wedge structure;
    frame mounted wedge structure, the pedestal mounted wedge structure and frame mounted wedge structure moving into a wedging position when the pedestal is in the forward and rearward positions to wedge the pedestal to the frame in the forward and rearward positions for vehicle operation;
    locking means acting between said pedestal and frame for urging the pedestal mounted wedge structure and frame mounted wedge structure into the wedging position when the pedestal is in the forward and rearward positions, said locking means including at least one locking wedge movable transverse to the direction of sliding motion between the pedestal and frame for wedging against a forward lock plate assembly to lock the pedestal in the forward position and a rear lock plate assembly to lock the pedestal in the rearward position; and
    a striker plate mounted between said forward and rearward lock plate assemblies to prevent engagement of the locking wedge between the forward and rearward positions of the pedestal.

* * * * *